Feb. 19, 1952     N. B. GALLENKAMP     2,585,925
MACHINE FOR MAKING EMULSIONS
Filed Nov. 27, 1945     2 SHEETS—SHEET 1

NORMA B. GALLENKAMP.
INVENTOR.

BY Emery, Holcombe & Blair
ATTORNEY.

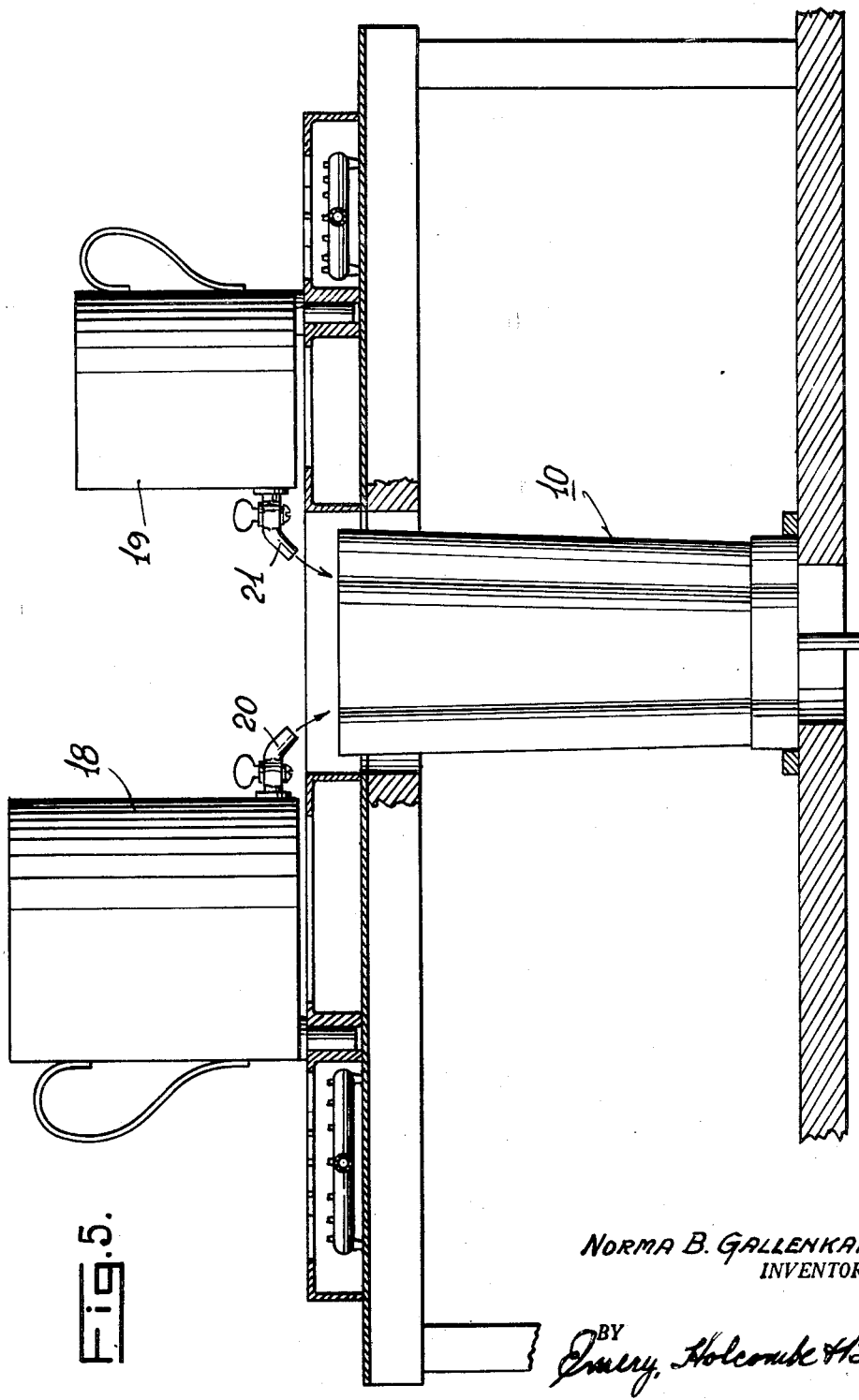

Patented Feb. 19, 1952

2,585,925

UNITED STATES PATENT OFFICE 2,585,925

MACHINE FOR MAKING EMULSIONS

Norma B. Gallenkamp, Houston, Tex.

Application November 27, 1945, Serial No. 631,076

6 Claims. (Cl. 259—107)

This invention relates to a new and improved mixer and a new composition made by this device.

It has long been desired to produce an emulsion containing pure water and pure oil. Heitmann in U. S. Patent No. 1,724,653, used a process of blowing gaseous fluid under pressure into an oily body to finely divide it for the purpose of obtaining an emulsion. Food and beverage mixers have long been known, in particular the patents to Cravaritis 2,226,372 and Poplawski 2,304,476, have devised a fruit cutter and food and beverage mixer wherein the propeller blades have been sharpened for the purpose of cutting a solid material to form a pulp and in the second patent to give a beverage.

The principal object of my invention is the provision of an improved mixer of the character identified.

Another object is the provision of an improved mixer wherein the liquids are subjected to a rapid cutting action and a still further object of my invention is to provide a mixer wherein the liquids are subjected to a cutting action and at the same time to a swirling action, which two actions combine to create a superior system of agitation.

A still further object of my invention is to produce an emulsion comprising two immiscible liquids by a combination of cutting action and swirling action.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

In the drawings:

Fig. 5 is a plan view showing the agitator assembled with the liquid containers.

Figure 1:
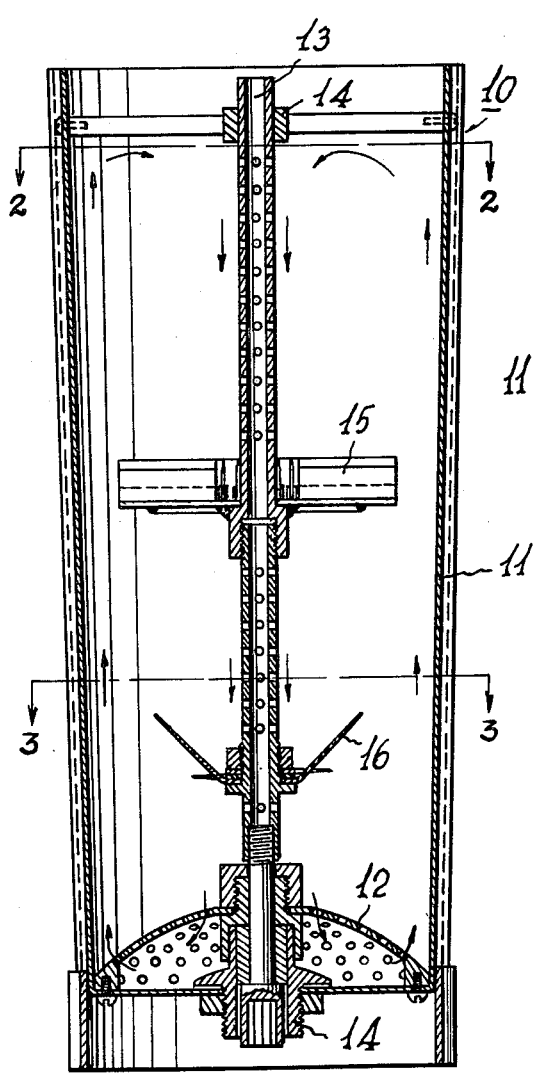
Figure 1 is a vertical sectional view showing a mixer made in accordance with my invention.

In the drawings a mixing device is shown which comprises a unit 10 which is a container consisting of a shell 11, a perforated dome or baffle 12 having orifices and located at the base of the shell and the hollow perforated shaft 13 supported by bearings 14 and 14. These have attached thereto the upper knives 15 and lower knives 16. This arrangement is shown in Fig. 2, as well as the construction of the shell 11 which is so made as to give a swirling action to the liquid when the liquid is agitated.

An assembly of the mixing device with the necessary containers 18, 19 having the cocks 20 and 21, respectively, is shown in Fig. 5.

Figure 2:
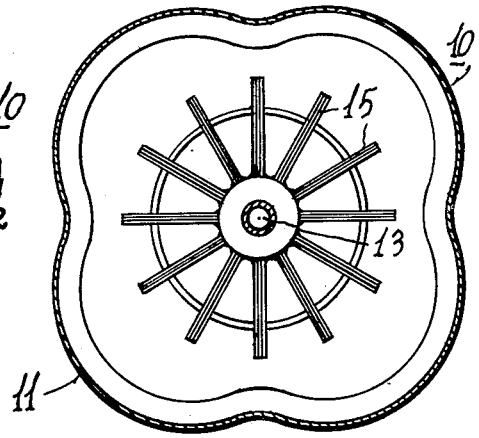
Fig. 2 is a sectional view taken on line 2—2 of Fig. 1, looking in the direction of the arrow.
Figure 3:
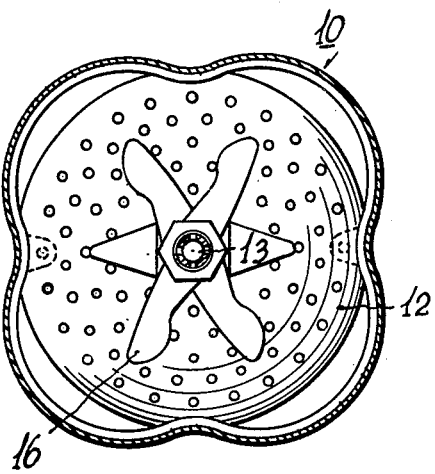
Fig. 3 is a sectional view taken on the line 3—3 looking in the direction of the arrow.
Figure 4:
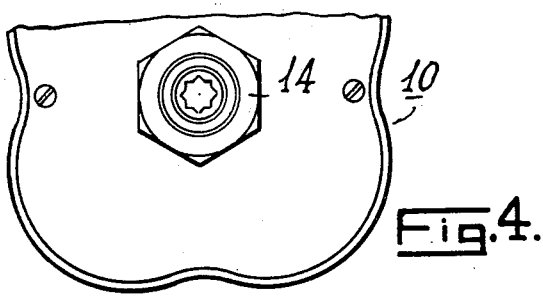
Fig. 4 is a plan view of the bottom showing the construction of the shaft, housing and the shaft.

Referring again to the shell 11, as shown in Fig. 1, and in cross section in Figs. 2 and 3 this shell is constructed so as to impart to the rotating liquid a swirling motion, i. e., a motion in which the direction is being constantly changed, in four separate and distinct parts. The knives located at the bottom of the shaft are of stout construction and in the particular embodiment shown in the drawings are six in number and impart to the liquid at least in part its rotation. Some of the knives are arranged at an angle to the shaft to impart motion to the liquid, others are at right angles to the shaft to give a cutting action. Liquid is forced down the center of the bowl through the perforations in the center of the dome 12 and back out through the perforations in the edge of the dome where it rises along the outer shell and falls back towards the center and is contacted with a relatively thin cutting surface of the knives 15, which in the embodiment shown in the drawings consists of twelve in number and range at right angles to the shaft, with the cutting edges at the top and bottom so as to contact with a violent cutting action, the liquid which is forced down upon them by the contour of the shell 11. The cycle is repeated over and over until a stable emulsion is produced. It is this combination of a swirling action and a cutting action that produces the unforeseen result in obtaining a mixing of the type hitherto unknown.

The following are specific and preferred embodiments of the invention but in no sense limit the scope thereof.

*Example I*

4 quarts of water
2 ounces of lanolin
1 fluid ounce of olive oil
1 fluid ounce of honey
2 fluid ounces of melted paraffin All of the above ingredients are placed in the tank having the smallest outlet and heated to 460° F. The water is placed in the other tank and heated to boiling and allowed to flow simultaneously with the other ingredients into the mixer. After three minutes agitation the creamy emulsion is allowed to cool.

*Example II*

2 quarts of water
2 dozen broken egg shells
1 quart of melted paraffin

Allow the shells to bo'l in the water for approximately five minutes in the larger container. The paraffin is heated in a smaller container to 460° F. and the two liquids allowed to run together into the mixer. After two minutes agitation the mix is allowed to cool. This paraffin emulsion has many uses.

Example III 1 dozen egg yolks slightly whipped are placed in the larger tank 2 quarts of olive oil
The juice of 4 lemons
1 teaspoonful of salt, are placed in the other tank.

The containers are thoroughly chilled with ice jackets before the above ingredients are placed therein. The two streams are allowed to flow simultaneously into the agitator from which the resulting emulsion may be removed.

Example IV 1 part of paraffin is placed in the small container and heated to 460° F.

20 parts of water are placed in the other container and heated to boiling. These are allowed to run simultaneously into the agitator and the resulting stable emulsion may be withdrawn from the shell 11.

It has been found that this emulsion may be made to contain as high as 37.5 of paraffin and is stable without the use of an emulsifying agent. When more than 37.5% of paraffin is introduced on standing the excess paraffin separates, but up to this limit the emulsion is stable.

In all of the above examples a preferred speed of 7000 R. P. M. are used. However speeds as high as 10,000 R. P. M. have been used and have proven satisfactory. Speeds less than 2000 R. P. M. do not give a satisfactory product and as stated above the preferred speed is 7000 R. P. M. or higher.

In all of the above examples the superb emulsion obtained is the result of a combination of swirling action and cutting action.

It is not intended that this invention be limited by the above examples as other oils and waxes besides paraffin wax, or olive oil may be used, such as petroleum lubricating oil, carnauba wax or mixtures of the hard waxes as used in the so-called "Simonizing process."

While in accordance with the provisions of the statute I have illustrated and described the best form of embodiment of my invention now known to me, it will be apparent to those skilled in the art that changes may be made in the form of the apparatus and in the composition of the emulsion disclosed without departing from the spirit of my invention, as set forth in the claims and that in some cases certain features of my invention may be used to advantage without a corresponding use of other features.

Having now described my invention, what I claim as new and desire to secure by Letters Patent is:

1. In a mixing device of the character described, an elongated mixing container, a driven shaft within the container and extending more than half the length of the container, an upper set of sharp blades radially secured to the shaft and co-planar with the shaft axis, and a lower set of sharp blades radially secured to the shaft and positioned transversely to the axis of the shaft, said sets of blades being spaced substantially apart from each other.

2. In a mixing device of the character described, a mixing container, a driven shaft within the container, a set of sharp blades radially secured to the shaft and co-planar with the shaft axis, a set of sharp blades radially secured to the shaft and positioned transversely to the axis of the shaft, said sets of blades being spaced substantially apart from each other, and high-speed driving means for the shaft.

3. In a mixing device of the character described, a mixing container, a driven perforated shaft within the container and extending substantially the entire length of the container, a set of sharp blades radially secured to the shaft in the plane of the shaft axis, and a set of sharp blades radially secured to the shaft and positioned transversely to the axis of the shaft, said sets of blades being spaced substantially apart from each other.

4. In a mixing device of the character described, a mixing container having an irregular internal wall contour, a driven shaft within the container, a set of sharp blades radially secured to the shaft in the plane of the shaft axis, and a set of sharp blades radially secured to the shaft and positioned transversely to the axis of the shaft, said sets of blades being spaced substantially apart from each other.

5. In a mixing device of the character described, a mixing container, a driven shaft within the container, a set of sharp blades radially secured to the shaft in the plane of the shaft axis, a set of sharp blades radially secured to the shaft and positioned transversely to the axis of the shaft, said sets of blades being spaced substantially apart from each other, and a fixed perforated baffle having its edge in contact with the container and enclosing a space at the bottom of the container.

6. In a mixing device of the character described, a mixing container having an irregular internal wall contour, a driven perforated shaft within the container, an upper set of sharp blades radially secured to the shaft and co-planar with the shaft axis, a lower set of sharp blades radially secured to the shaft and positioned transversely to the shaft axis, the upper set of blades being substantially spaced from the lower set and both sets of blades being spaced from the wall of the container, a perforated baffle below the lower set of blades enclosing a space at the bottom of the container, and high-speed driving means for said shaft.

NORMA B. GALLENKAMP.

REFERENCES CITED

The following references are of record in the file of this patent:

UNITED STATES PATENTS

| Number | Name | Date |
|---|---|---|
| 1,031,666 | Richmond | July 2, 1912 |
| 1,242,445 | Ittner | Oct. 9, 1917 |
| 1,603,546 | Kirschbraun | Oct. 19, 1926 |
| 1,762,950 | Beers | June 10, 1930 |
| 1,924,080 | Gram | Aug. 22, 1933 |
| 1,932,643 | Schrauth | Oct. 31, 1933 |
| 1,969,242 | Szegvari | Aug. 7, 1934 |
| 2,012,680 | Hammes | Aug. 27, 1935 |
| 2,046,537 | Thompson | July 7, 1936 |
| 2,068,136 | Hulbert | Jan. 10, 1937 |
| 2,109,501 | Osius | Mar. 1, 1938 |
| 2,148,608 | De Stubner | Feb. 28, 1939 |
| 2,340,846 | Landes | Feb. 1, 1944 |
| 2,350,800 | Muller | June 6, 1944 |